United States Patent [19]
Odagiri

[11] Patent Number: 5,914,167
[45] Date of Patent: Jun. 22, 1999

[54] INFORMATION RECORDING MEDIUM WITH LIGHT-EMITTING AREA, STORAGE CASE WITH LIGHT-EMITTING AREA FOR INFORMATION RECORDING MEDIUM, AND SHEET WITH LIGHT-EMITTING AREA FOR INFORMATION RECORDING MEDIUM

[75] Inventor: Hirokazu Odagiri, Miyagi, Japan

[73] Assignee: Sony Corporation, Japan

[21] Appl. No.: 08/988,214

[22] Filed: Dec. 10, 1997

[30] Foreign Application Priority Data

Dec. 24, 1996 [JP] Japan ..................................... 8-343789

[51] Int. Cl.$^6$ ....................................................... B32B 3/00
[52] U.S. Cl. ........................ 428/64.1; 428/64.8; 428/690; 428/913; 430/270.11; 430/495.1; 430/945; 369/283; 369/288
[58] Field of Search .................................. 428/64.1, 64.4, 428/64.8, 690, 913; 430/270.11, 495.1, 945; 369/283, 288

[56] References Cited

U.S. PATENT DOCUMENTS

| | | | |
|---|---|---|---|
| 4,708,817 | 11/1987 | Dudnick | 252/301.16 |
| 5,024,898 | 6/1991 | Pitts et al. | 428/511 |
| 5,279,058 | 1/1994 | Kohn | 428/690 |

*Primary Examiner*—Elizabeth Evans
*Attorney, Agent, or Firm*—Rader, Fishman & Grauer; Ronald P. Kananen

[57] ABSTRACT

An information recording medium, a storage case for storing an information recording medium, or a sheet for use with an information recording medium, has a light-emitting area coated with a phosphorescent paint, and a luminous paint area coated with a luminous paint for emitting exciting light to stimulate the light-emitting area to emit light, the luminous paint area being disposed adjacent to or on the light-emitting area.

12 Claims, 10 Drawing Sheets

INFORMATION RECORDING MEDIUM WITH LIGHT-EMITTING AREA, STORAGE CASE WITH LIGHT-EMITTING AREA FOR INFORMATION RECORDING MEDIUM, AND SHEET WITH LIGHT-EMITTING AREA FOR INFORMATION RECORDING MEDIUM

BACKGROUND OF THE INVENTION

1. Field of the Invention

The present invention relates to an information recording medium, a storage case for an information recording medium, and a sheet for an information recording medium, all of which have a light-emitting area and a coated area of luminous paint for emitting exciting light to stimulate the light-emitting area to emit light.

2. Description of the Related Art

Information recording mediums including audio compact cassettes, compact discs, etc. are being widely used at present.

These information recording mediums find use at night and in dark rooms as well as in daylight and bright conditions. Therefore, it has been desired to increase the visibility of characters, symbols, and other indicia on information recording mediums, storage cases thereof, and sheets thereon.

It often happens for car drivers to handle information recording mediums for playback on car audio devices while driving cars. For safety reasons, it is of highly critical concern to increase the visibility of characters, symbols, and other indicia on information recording mediums, storage cases thereof, and sheets thereon that are used in cars.

It has heretofore been proposed to coat areas which bear characters, symbols, and other indicia on information recording mediums, storage cases thereof, and sheets thereon, with a layer of paint that emits light by itself upon being stimulated, i.e., a layer of luminous paint, for thereby increasing the visibility of those characters, symbols, and other indicia.

For example, it has been practiced to print labels of audio tape cassettes with luminous paint, apply seals coated with luminous paint to labels of audio tape cassettes, and coat a layer of luminous paint on an unrecorded area of information recording mediums.

Efforts have been made to develop luminous paints capable of emitting light for a long period of time. Since these luminous paints are highly expensive to manufacture, it will be highly costly to coat those areas of audio tape cassette label which bear characters, symbols, and other indicia with an amount of luminous paint that is sufficient to directly illuminate those areas with light emitted thereby.

SUMMARY OF THE INVENTION

It is an object of the present invention to provide an information recording medium, a storage case for an information recording medium, and a sheet for an information recording medium, which bear characters, symbols, and other indicia that can be seen with good visibility with a minimum amount of luminous paint used.

According to an aspect of the present invention, there is provided an information recording medium comprising a light-emitting area coated with a phosphorescent paint, and a luminous paint area coated with a luminous paint for emitting exciting light to stimulate the light-emitting area to emit light, the luminous paint area being disposed adjacent to or on the light-emitting area.

According to another aspect of the present invention, there is provided a storage case for storing an information recording medium, comprising a light-emitting area coated with a phosphorescent paint, and a luminous paint area coated with a luminous paint for emitting exciting light to stimulate the light-emitting area to emit light, the luminous paint area being disposed adjacent to or on the light-emitting area.

According to still another aspect of the present invention, there is provided a sheet for use with an information recording medium, comprising a light-emitting area coated with a phosphorescent paint, and a luminous paint area coated with a luminous paint for emitting exciting light to stimulate the light-emitting area to emit light, the luminous paint area being disposed adjacent to or on the light-emitting area.

The information recording medium, the storage casing, or the sheet may further comprise a writable layer disposed on the light-emitting area.

The light-emitting area, coated with the phosphorescent paint that is relatively inexpensive, is combined with the luminous paint area coated with the luminous paint which will emit exciting light to stimulate the light-emitting area to emit light. Therefore, characters, symbols, and other indicia marked on the information recording medium, the storage casing, or the sheet can be seen with good visibility with the light-emitting area that is coated with the relatively inexpensive phosphorescent paint which can be stimulated by the exciting light from the luminous paint area. The amount of relatively expensive luminous paint used in the luminous paint area can thus be small enough to lower the cost of the information recording medium, the storage casing, or the sheet.

If the light-emitting layer is coated with phosphorescent paints capable of emitting lights of three primaries, then the emitted lights of three primaries may be separated to produce full colors, gradations, or intermediate colors, thus enabling the light-emitting layer to have an aesthetically pleasing appearance.

DETAILED DESCRIPTION OF THE PREFERRED EMBODIMENTS

Like or corresponding parts are denoted by like or corresponding reference characters and representations throughout views.

A sheet for an information recording medium according to certain embodiments of the present invention can be applied to an inner or outer surface of a case for an elongate recording medium such as a magnetic tape, or a cassette for a magnetic tape, or can be inserted into a magnetic tape.

Figure 1:
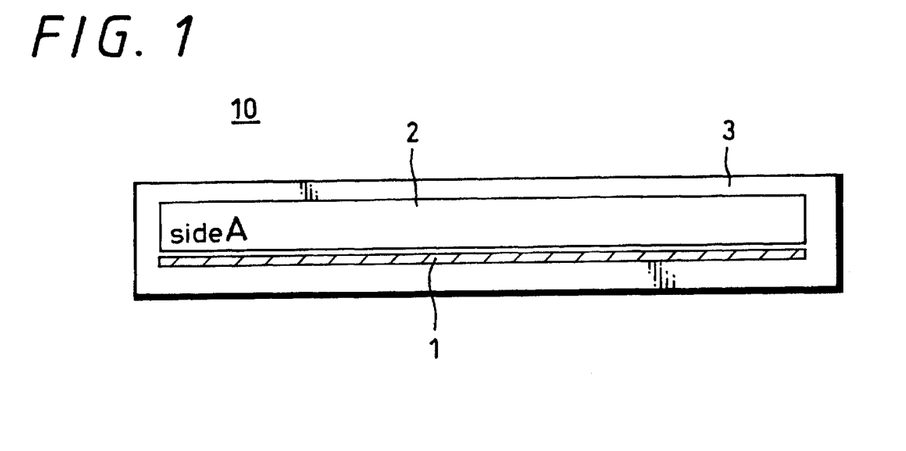
FIG. 1 is a plan view of a sheet for an information recording medium according to an embodiment of the present invention.
Figure 2:
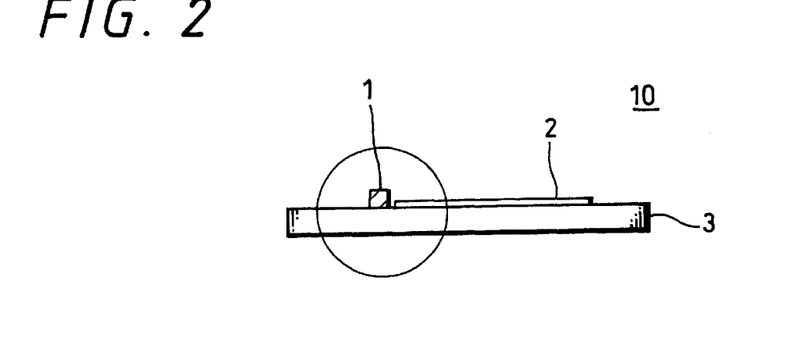
FIG. 2 is a transverse cross-sectional view of the sheet shown in FIG. 1.

As shown in FIGS. 1 and 2, a sheet 10 for an information recording medium comprises a sheet base 3, a luminous paint layer 1 disposed on the sheet base 3, and a light-emitting layer 2 disposed on the sheet base 3.

The light-emitting layer 2 comprises a coated layer of phosphorescent paint, and the luminous paint layer 1 comprises a coated layer of luminous paint for emitting exciting light to stimulate the phosphorescent paint of the light-emitting layer 2. The luminous paint layer 1 and the light-emitting layer 2 are positioned adjacent to each other.

The sheet base 3 is made of a sheet of paper, synthetic resin, or the like on which information can be written, and should preferably be white so as to provide high reflectance with respect to light.

Examples of the coated phosphorescent paint of the light-emitting layer 2 are shown in the following Table, which sets forth their names, chemical compositions, peak wavelengths (nm) of light-emission spectrums, and colors of emitted colors.

TABLE

| Paint name | Chemical composition | Peak wavelength (nm) | Color of emitted light |
|---|---|---|---|
| Blue-base paint | $BaMg_2Al_{16}O_{27}:Eu^{2+}$ | 452 | Blue |
| Green-base paint | $BaMg_2Al_{16}O_{27}:Eu^{2+}, Mn^{2+}$ | 450, 515 | Blue green |
| Red-base paint | $Y_2O_2S:EU^{3+}$ | 611 | Reddish orange |

Examples of the luminous paint which emits exciting light to stimulate the phosphorescent paints in the above Table to emit light are $Sr_4Al_{14}O_{25}$:Eu, Dy, and $SrAl_2O_4$:Eu, Dy.

These luminous paints have an ability to store light and emit the stored light for an afterglow time of 200 minutes or longer.

The luminous paint may be coated to a relatively large thickness by a silk screen printing process, thereby to produce the luminous paint layer 1. The luminous paint layer 1 should preferably have a thickness of about 0.1 mm.

The particles contained in the phosphorescent paint of the light-emitting layer 2 have a diameter of several $\mu$m. Therefore, the light-emitting layer 2 may be formed by a silk screen printing process, a pad printing process, or a gravure printing process. The light-emitting layer 2 has a thickness of about several tens $\mu$m.

A writable layer on which information such as characters, symbols, or other indicia can be written may be disposed on the light-emitting layer 2. The writable layer may be formed by printing a paint containing calcium carbonate or protein powder after the phosphorescent paint has been printed as the light-emitting layer 2, or coating a thin resin film with a mat surface on the phosphorescent paint printed as the light-emitting layer 2.

The principles of emission of light from the light-emitting layer 2 will be described below.

Figure 3:
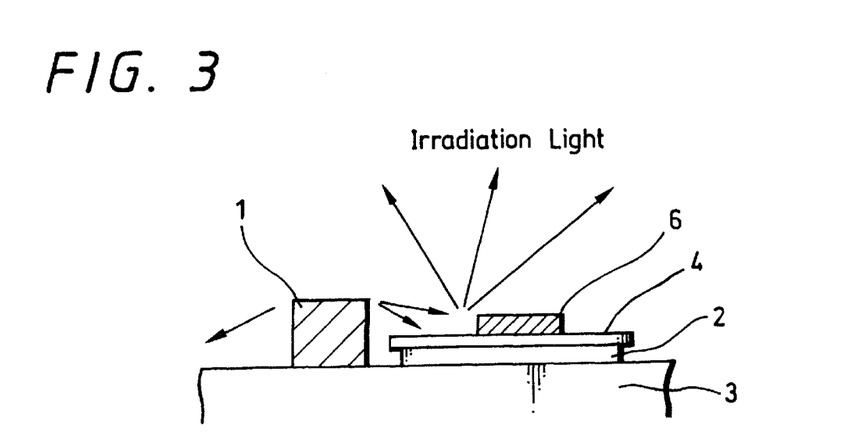
FIG. 3 is an enlarged fragmentary transverse cross-sectional view of a coated layer of luminous paint and a light-emitting area of the sheet.

FIG. 3 shows in fragmentary cross section the luminous paint layer 1 and the light-emitting layer 2 of the sheet shown in FIG. 2. In FIG. 3, a writable layer 4 on which information such as characters, symbols, or other indicia can be written is disposed on the light-emitting layer 2, and characters, symbols, or other indicia 6 are written on the writable layer 4.

The luminous paint of the luminous paint layer 1 and the phosphorescent paint of the light-emitting layer 2 are selected such that the spectrum of exciting light emitted by the luminous paint and the spectrum of excited light emitted by the phosphorescent paint have an overlapping wavelength region. When stored light is emitted from the luminous paint layer 1, the emitted light is applied as exciting light to stimulate the light-emitting layer 2 to emit light. The light emitted from the light-emitting layer 2 allows the characters, symbols, or other indicia 6 on the layer 4 to be visible to the human eye even at night or in a dark room.

Since the light to illuminate those characters, symbols, or other indicia 6 mainly comes from the light-emitting layer 2 which is made of a relatively inexpensive phosphorescent paint, the amount of luminous paint which is relatively expensive may be reduced. Accordingly, the cost of the sheet 10 is relatively low.

The optic nerve of the human eye exhibits different spectral luminous efficiencies depending on the wavelength of light, and senses yellowish green light with highest sensitivity.

The spectrum of yellowish green light emitted from a luminous paint contains wavelengths in the range of from four hundred and several tens nm to six hundred and several tens nm. It is preferable to make the light-emitting layer 2 of a phosphorescent paint which emits visible excited light in a spectrum near those wavelengths, for thereby allowing the observer to visually recognize desired characters, symbols, or other indicia with the light emitted from both the luminous paint layer 1 and the light-emitting layer 2.

The light-emitting layer 2 may be coated with a combination of phosphorescent paints that emit respective lights of three primaries, i.e., red, green, and blue. If these phosphorescent paints are coated and adjusted such that their emitted lights of three primaries will be separated, the light-emitting layer 2 may look like a photograph-like, glossy print including full colors, gradations, or intermediate colors, thus providing an aesthetically pleasing appearance.

Figure 4:
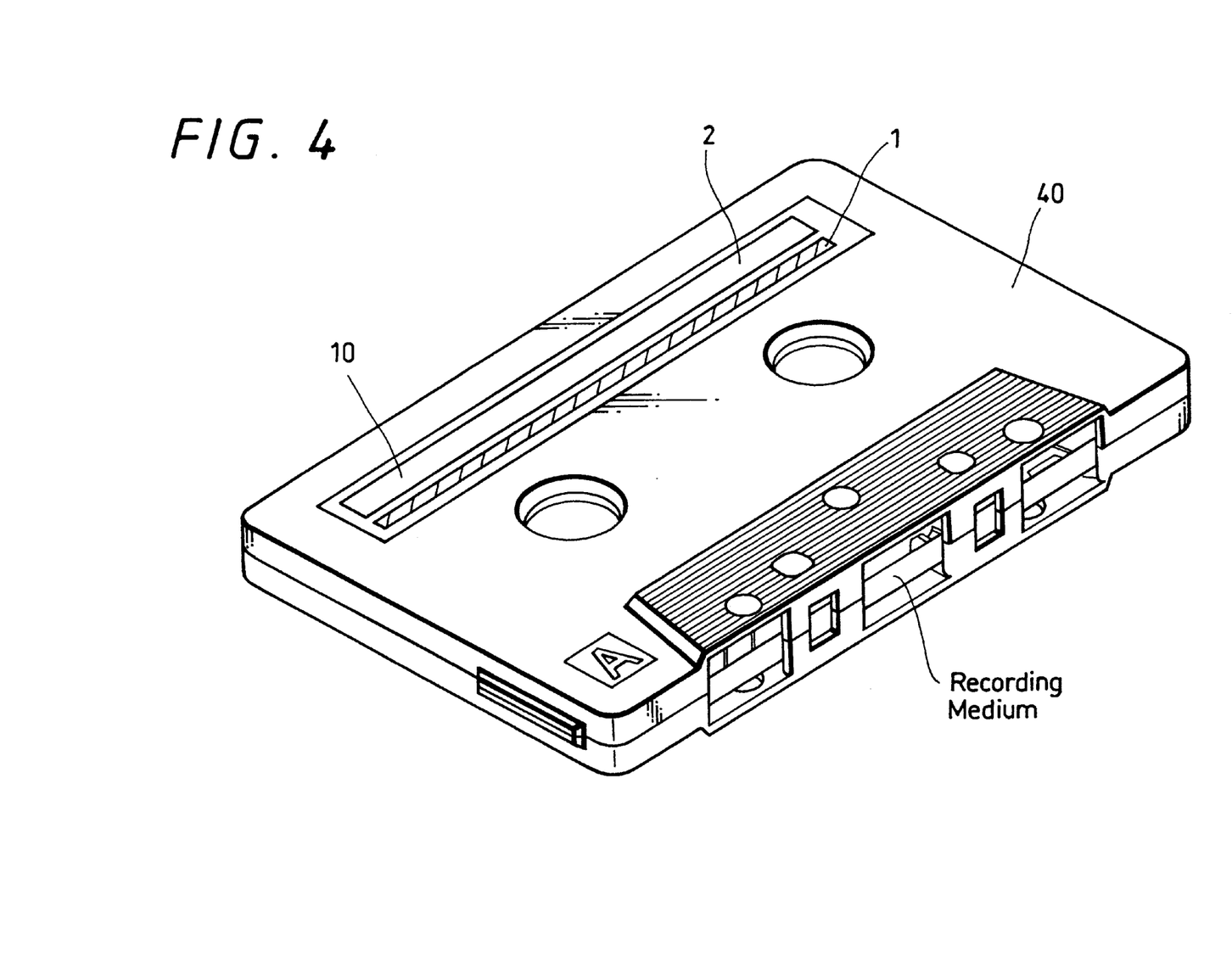
FIG. 4 is a perspective view of a tape cassette with the sheet applied thereto.
Figure 5:
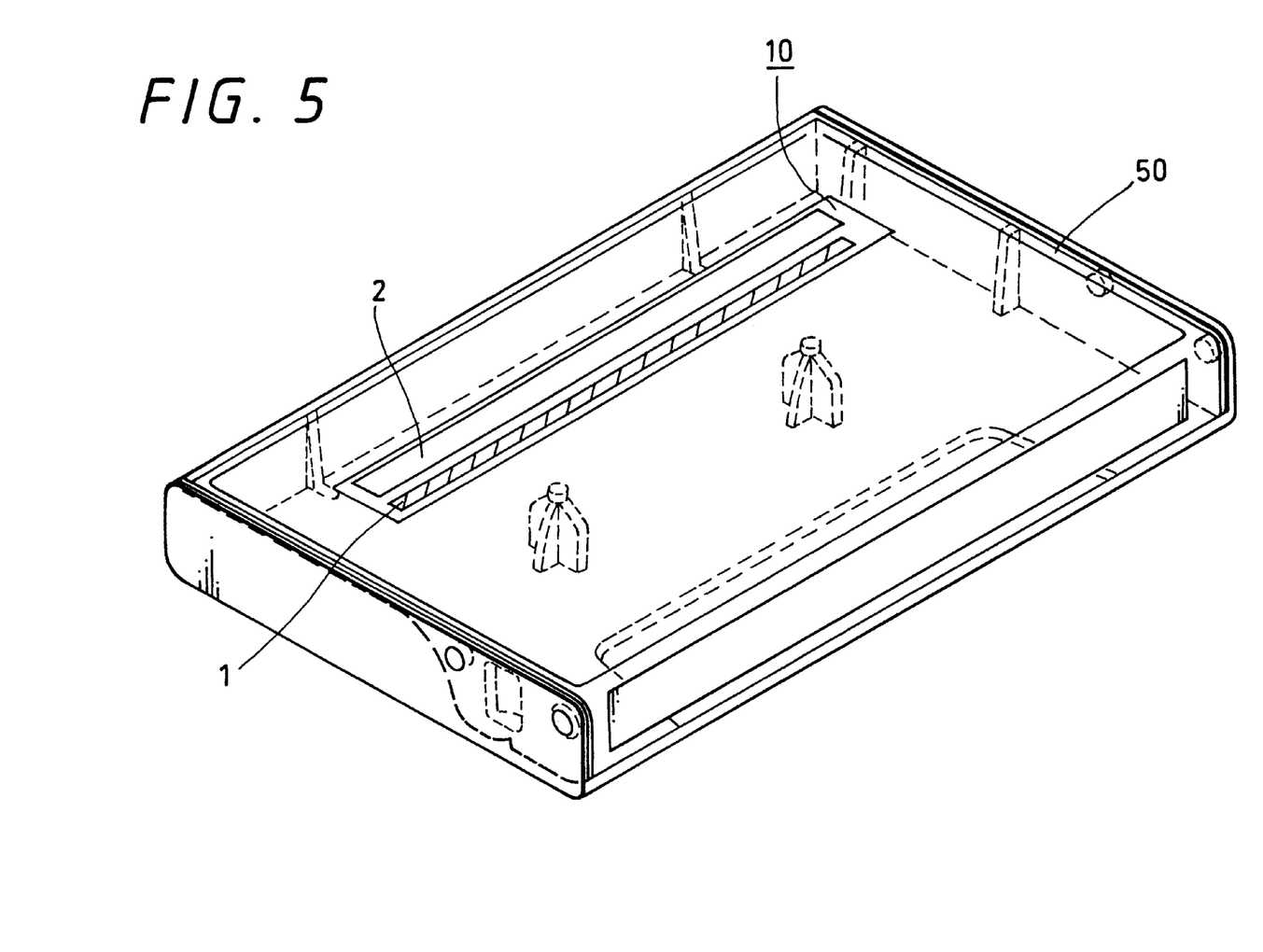
FIG. 5 is a perspective view of a tape cassette storage case with the sheet applied thereto.

The sheet 10 may be applied to a tape cassette (casing) 40 as shown in FIG. 4, or may be applied to a tape cassette storage case 50 as shown in FIG. 5.

Alternatively, a luminous paint and a phosphorescent paint may be coated directly on a tape cassette or a tape cassette storage case thereby to form the luminous paint layer 1 and the light-emitting layer 2 thereon. In this case, an area of the tape cassette or the tape cassette storage case where the light-emitting layer 2 is to be formed should preferably be coated with a pigment of white or the like that will reflect light well or formed of a white material before a phosphorescent paint is coated.

Figure 6:
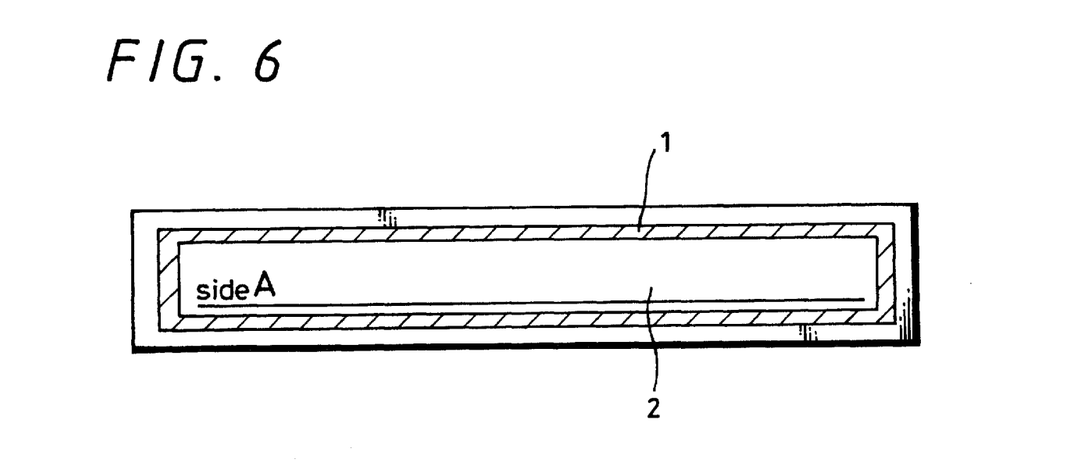
FIG. 6 is a plan view of a sheet for an information recording medium according to another embodiment of the present invention.
Figure 7:
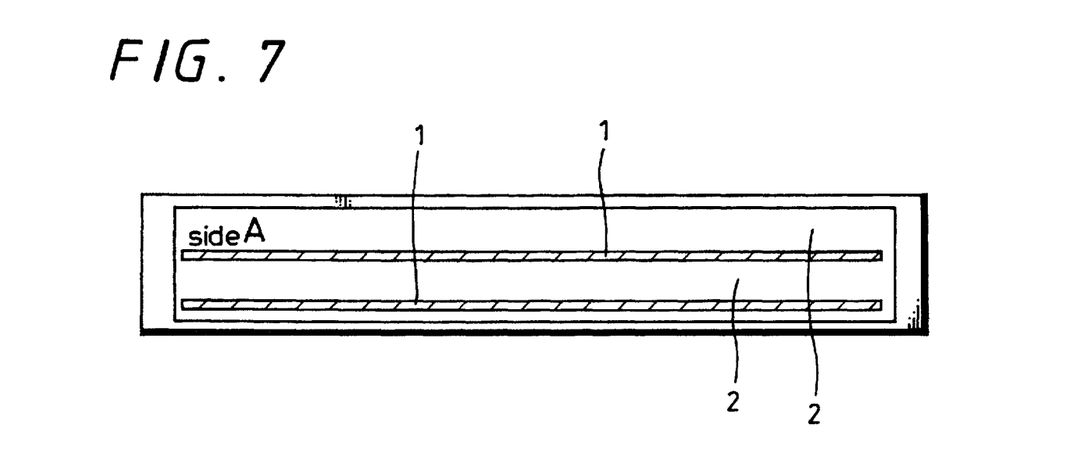
FIG. 7 is a plan view of a sheet for an information recording medium according to still another embodiment of the present invention.

In the embodiment shown in FIG. 1, the luminous paint layer 1 is positioned adjacent to the light-emitting layer 2. However, the luminous paint layer 1 and the light-emitting layer 2 may be formed in patterns different from the pattern shown in FIG. 1. For example, FIG. 6 shows a sheet according to another embodiment which has a luminous paint layer 1 disposed in a shape surrounding a light-emitting layer 2. A sheet according to still another embodiment shown in FIG. 7 has luminous paint layers 1 disposed in superposed relation to a light-emitting layer 2.

In the above embodiments, the sheet 10 has the light-emitting layer 2 and the luminous paint layer 1 which emits exciting light to stimulate the phosphorescent paint of the light-emitting layer 2. However, the present invention is not limited to the above details, but may be applied to various other configurations.

More specifically, the principles of the present invention are also applicable to the provision of a luminous paint layer and a light-emitting layer on a magnetooptical disk, a phase-change disk, and any of various other information recording mediums in the form of disks, cards, sheets, or the like, a storage case for such information recording mediums, a label for use with such information recording mediums, etc.

Figure 8A:
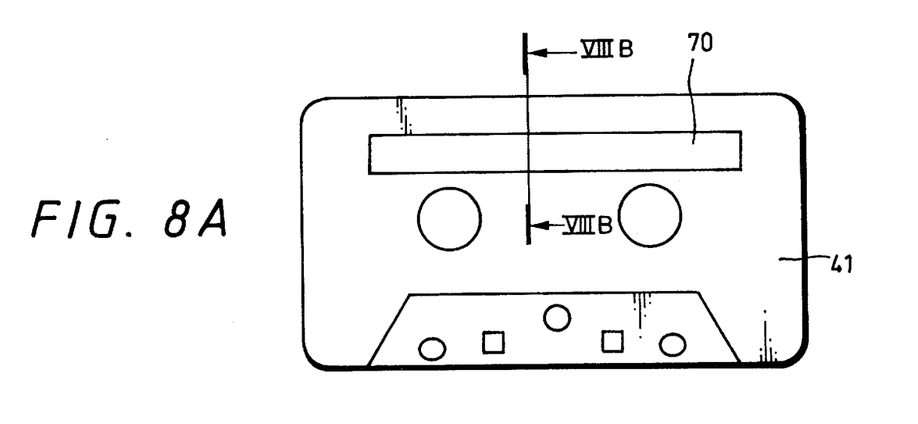
FIG. 8A is a plan view of a tape cassette according to the present invention.
Figure 8B:
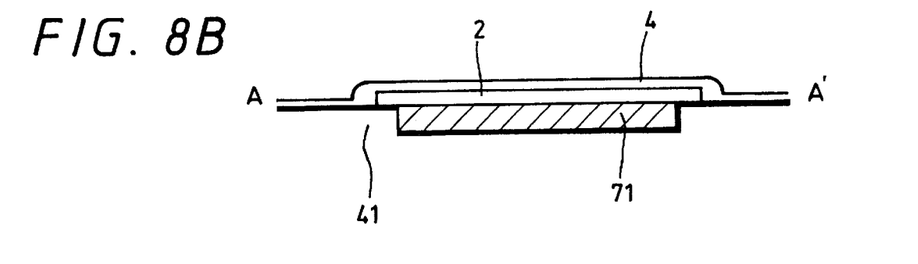
FIG. 8B is a cross-sectional view taken along line VIIIB—VIIIB of FIG. 8A.

FIGS. 8A and 8B illustrate a tape cassette 41 to which the principles of the present invention are applied.

As shown in FIG. 8A, the tape cassette 41 has a label 70 comprising a luminous paint resin layer 71 formed of synthetic resin containing a luminous paint, a light-emitting layer 2 formed of a phosphorescent paint coated on the luminous paint resin layer 71, and a writable layer 4 disposed on the light-emitting layer 2. The label 70 allows the user to visually observe characters, symbols, or other indicia written on the writable layer 4 with good visibility.

The principles of the present invention are also applicable to an optical disk having pits formed in a surface thereof as representing information signals, a reflecting film disposed over the pits, and a photo-setting protective film disposed on the reflecting film. The luminous paint layer 1 and the light-emitting layer 2 may be disposed in various shapes on an unrecorded area of the optical disk.

The principles of the present invention are also applicable to flanged tape reels housed in a tape cassette with a magnetic tape wound on the flanged tape reels.

Figure 9:
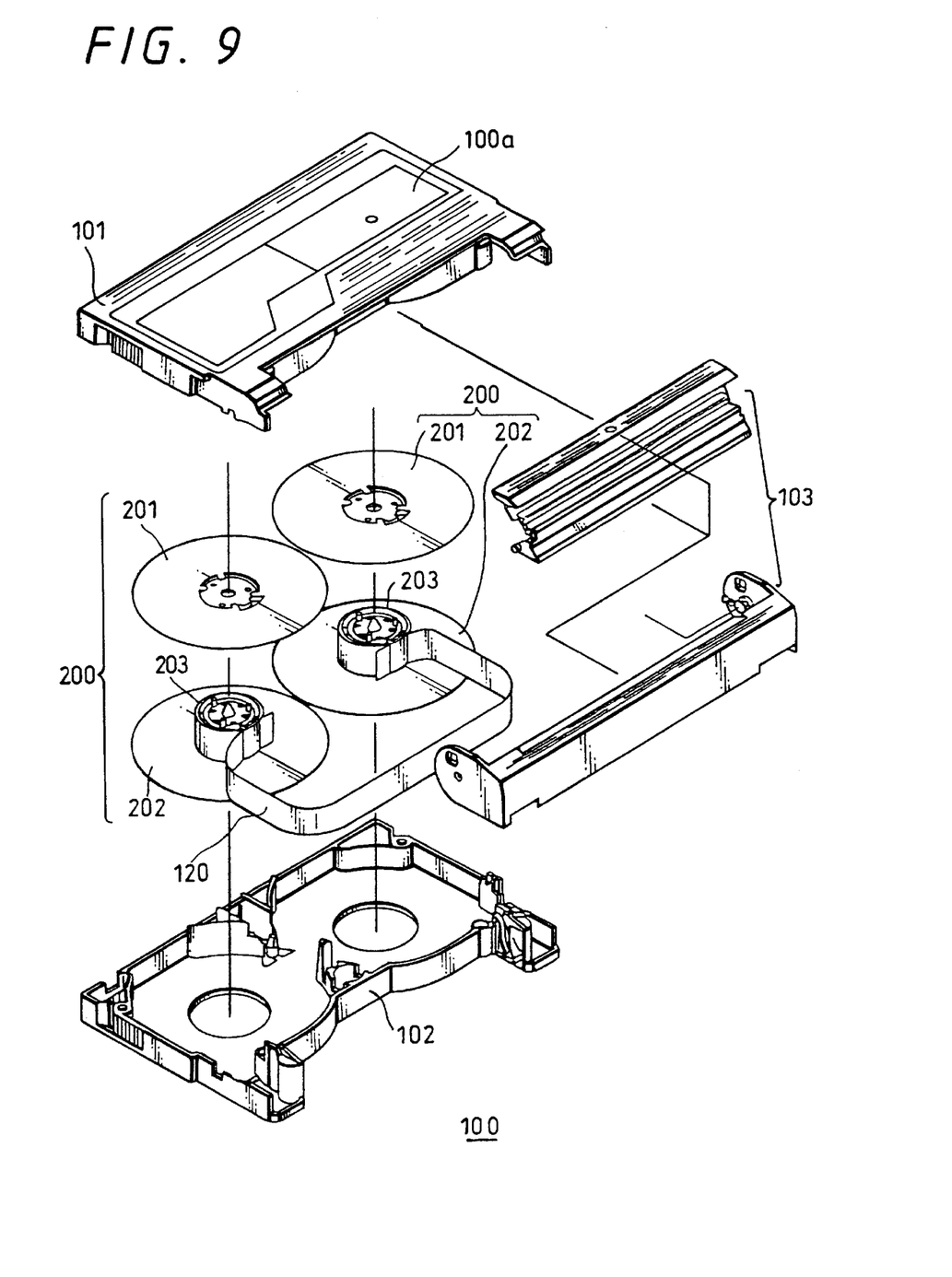
FIG. 9 is an exploded perspective view of a magnetic recording medium having flanged tape reels with a magnetic tape wound thereon.

FIG. 9 shows in exploded perspective a magnetic recording medium (tape cassette) 100 having flanged tape reels 200 with a magnetic tape 120 wound thereon.

The tape cassette 100 comprises an upper shell 101, a lower shell 102 joined thereto, and a pair of flanged tape reels 200 with a magnetic tape 120 wound thereon, the flanged tape reels 200 being housed in the upper and lower shells 101, 102. A lid assembly 103 is angularly movably mounted on a front end of the upper and lower shells 101, 102.

Each of the reels 200 comprises an upper flange 201, a lower flange 202, and a hub 203 interconnecting the upper and lower flanges 201, 202, the magnetic tape 120 being wound around the hub 203.

The upper shell 101 has a transparent or semi-transparent window 100a for allowing the user to visually observe the upper flanges 201 of one of the reels 200 from outside of the tape cassette 100. The upper flange 201 of one of the reels 200 which can be observed through the window 100a is shown in FIG. 10.

Figure 10:
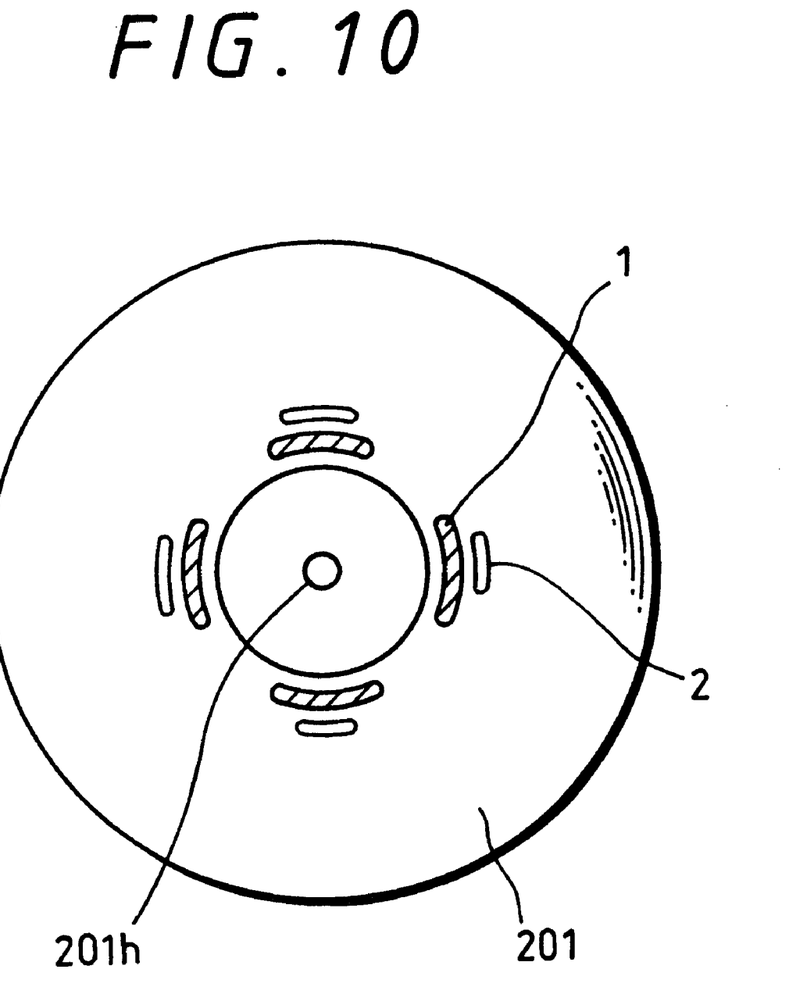
FIG. 10 is an enlarged plan view of an upper flange of one of the flanged tape reels shown in FIG. 9.

As shown in FIG. 10, the upper flange 201 has arcuate patterns of the luminous paint layer 1 and the light-emitting layer 2 for emitting light which permits the user to tell one side from the other of the tape cassette 100. The light emitted from the luminous paint layer 1 and the light-emitting layer 2 may be used to illuminate characters, symbols, or other indicia for the user to read details of recorded materials. Therefore, the user finds it easy to load the tape cassette 100 into or unload the tape cassette 100 from a tape playback device or otherwise handle the tape cassette 100 in a dark room or under dark conditions.

The present invention is further applicable to a casing which houses a recording medium therein, such as a floppy disk (FD), a minidisk (MD), or the like.

Figure 11:
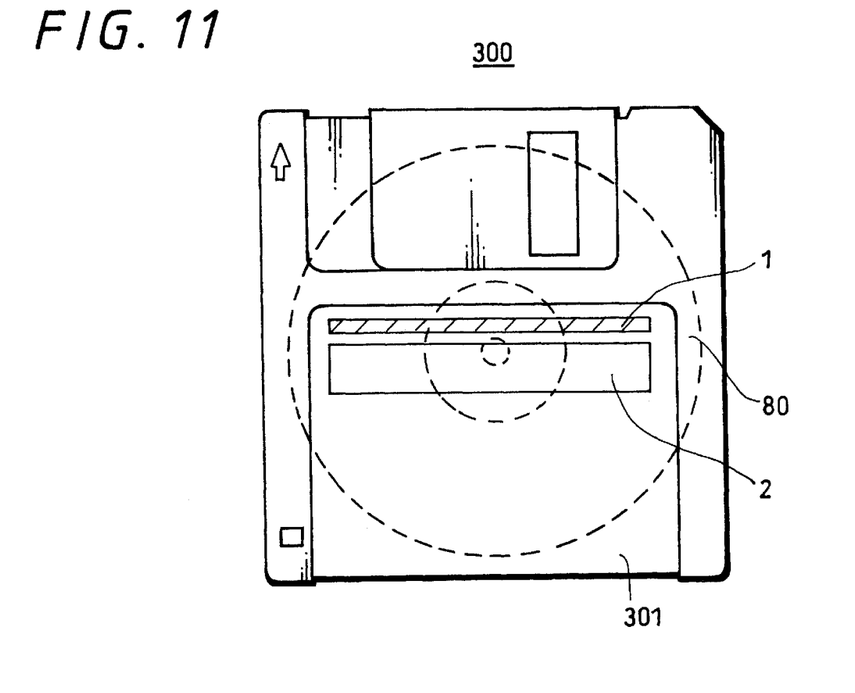
FIG. 11 is a plan view of a floppy disk which accommodates a magnetic sheet therein according to the present invention.

FIG. 11 shows a floppy disk 300 having a casing 301 which accommodates a magnetic sheet 80 therein according to the present invention. As shown in FIG. 11, the luminous paint layer 1 and the light-emitting layer 2 are disposed on the casing 301.

Figure 12A:
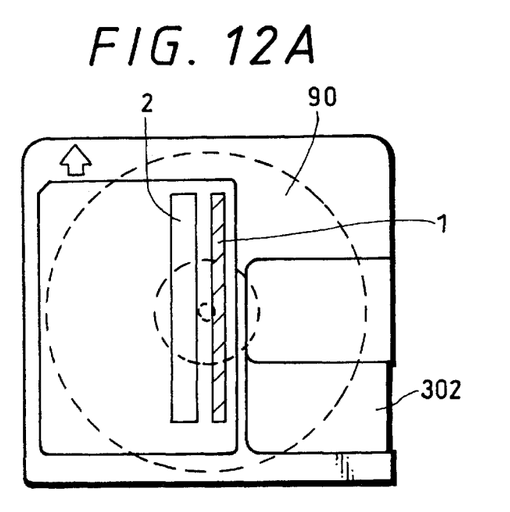
FIG. 12A is a plan view of a minidisk which accommodates a magnetooptical disk therein.
Figure 12B:
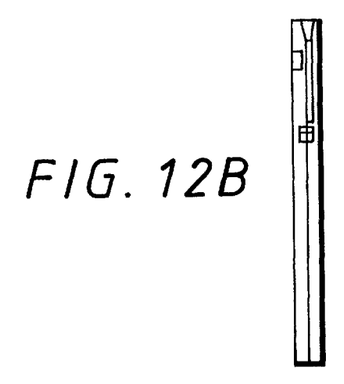
FIGS. 12B and 12C are side elevational views of the minidisk shown in FIG. 12A.
Figure 12C:
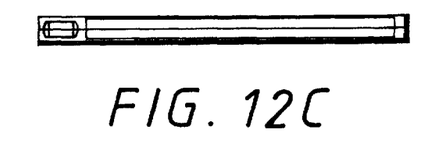

FIGS. 12A through 12C show a minidisk having a casing 302 which accommodates a magnetooptical disk 90 therein according to the present invention. As shown in FIG. 12A, the luminous paint layer 1 and the light-emitting layer 2 are disposed on the casing 302.

Figure 13:
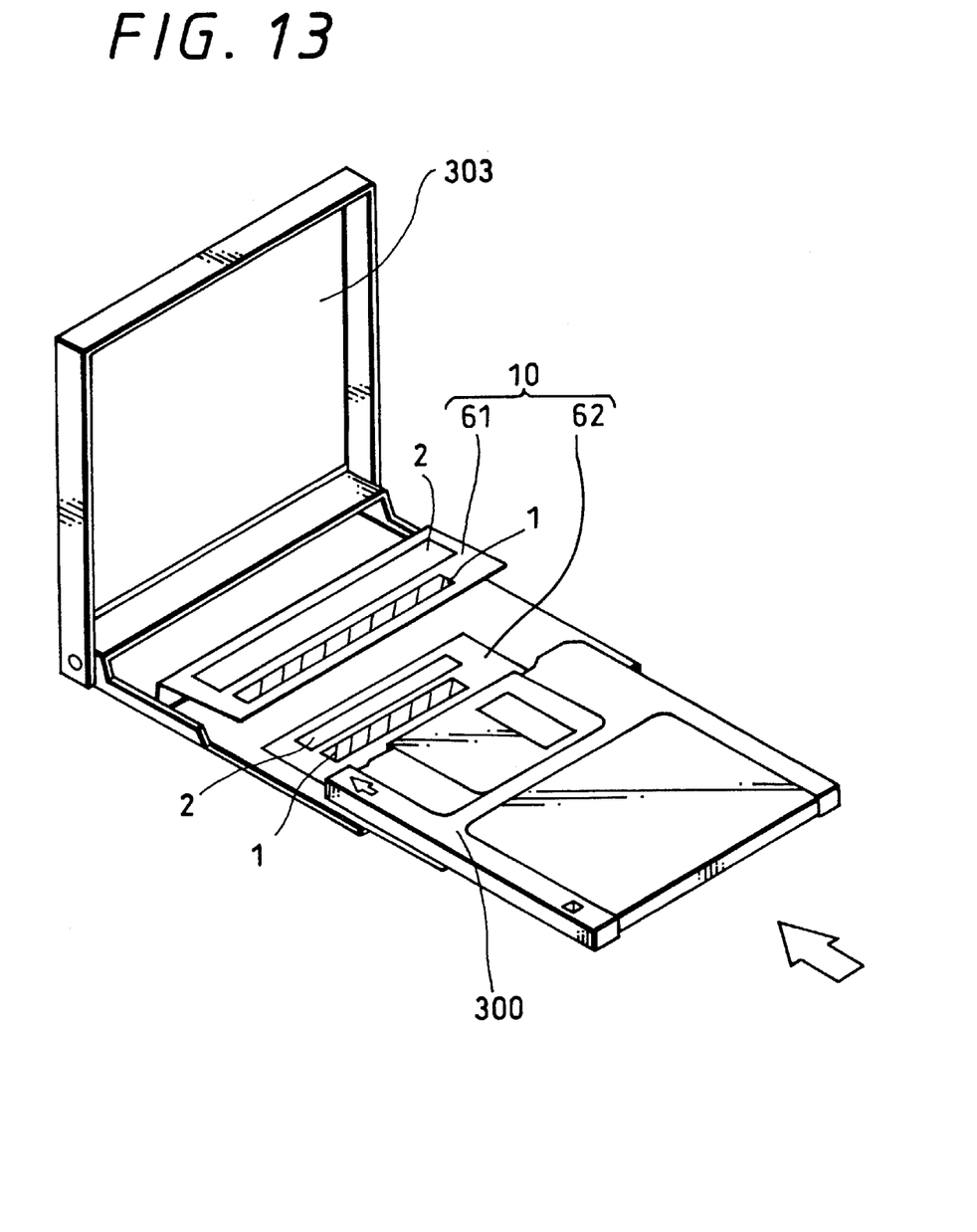
FIG. 13 is a perspective view of a storage case for an information recording medium, a card, a label, and a floppy disk according to the present invention.

The sheet 10 shown in FIG. 1 may be used as a card 61 and a label 62 housed in a storage case 303 for an information recording medium such as an FD, as shown in FIG. 13. The luminous paint layer 1 and the light-emitting layer 2 are disposed in various shapes in the vicinity of characters, symbols, and other indicia on the card 61 and the label 62.

Figure 14:
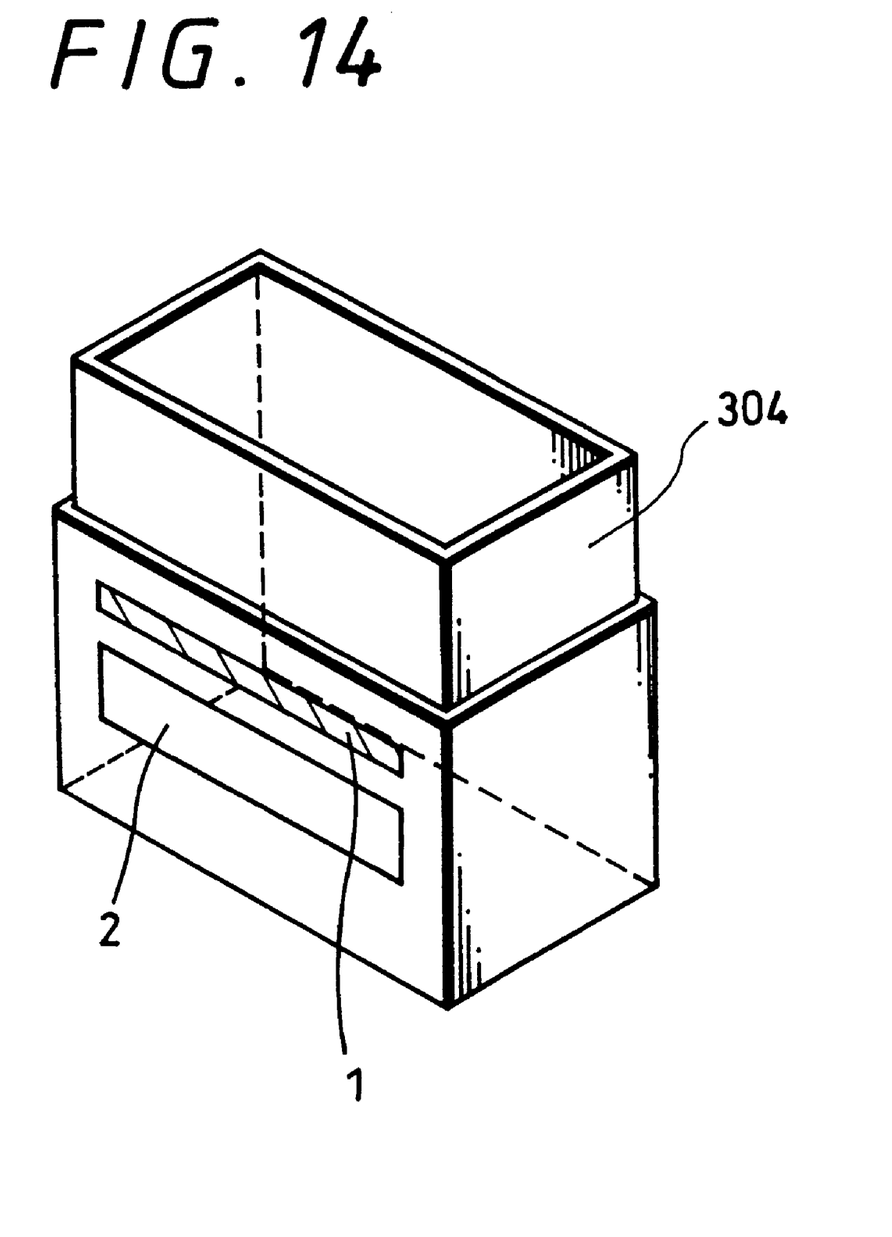
FIG. 14 is a perspective view of a storage case for housing a plurality of information recording mediums according to the present invention.

The principles of the present invention are not limited to use on a storage case for housing a single information recording medium, but are applicable to use on a storage case 304 for housing a plurality of information recording mediums, as shown in FIG. 14.

The writable layer formed on the information recording medium, the storage case for an information recording medium, or the sheet for an information recording medium may be positioned in a range that can be illuminated by light emitted from the light-emitting layer 2, rather than on the light-emitting layer 2.

The phosphorescent paint and the luminous paint are not limited to the specific examples, but may be of various other materials.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An information recording medium comprising:
    a light-emitting area coated with a phosphorescent paint; and
    a luminous paint area coated with a luminous paint for emitting exciting light to stimulate said light-emitting area to emit light, said luminous paint area being disposed adjacent to or on said light-emitting area.

2. An information recording medium according to claim 1, further comprising a tape-shaped or disk-shaped recording medium and a casing which houses said tape-shaped or disk-shaped recording medium, said light-emitting area and said luminous paint area being disposed on said casing.

3. An information recording medium according to claim 1, further comprising a tape cassette, a flanged tape reel disposed in said tape cassette, and a magnetic tape wound on said flanged tape reel, said light-emitting area and said luminous paint area being disposed on said flanged tape reel.

4. An information recording medium according to claim 1, further comprising an optical disk having pits formed in a surface thereof as representing information signals, a reflecting film disposed over said pits, and a photo-setting protective film disposed on said reflecting film, said light-emitting area and said luminous paint area being disposed on said optical disk.

5. An information recording medium according to claim 1, further comprising a writable layer positioned in an area illuminable by the light emitted from said light-emitting area.

6. An information recording medium according to claim 1, further comprising a writable layer disposed on said light-emitting area.

7. A storage case for storing an information recording medium, comprising:

a light-emitting area coated with a phosphorescent paint; and a luminous paint area coated with a luminous paint for emitting exciting light to stimulate said light-emitting area to emit light, said luminous paint area being disposed adjacent to or on said light-emitting area.

8. A storage casing according to claim 7, further comprising a writable layer positioned in an area illuminatable by the light emitted from said light-emitting area.

9. A storage casing according to claim 7, further comprising a writable layer disposed on said light-emitting area.

10. A sheet for use with an information recording medium, comprising:

a light-emitting area coated with a phosphorescent paint; and a luminous paint area coated with a luminous paint for emitting exciting light to stimulate said light-emitting area to emit light, said luminous paint area being disposed adjacent to or on said light-emitting area.

11. A sheet casing according claim 10, further comprising a writable layer positioned in an area illuminatable by the light emitted from said light-emitting area.

12. A sheet casing according claim 10, further comprising a writable layer disposed on said light-emitting area.

* * * * *